United States Patent [19]

Nakata et al.

[11] Patent Number: 5,023,147
[45] Date of Patent: Jun. 11, 1991

[54] CERAMICS-METAL JOINTED BODY

[75] Inventors: Hirohiko Nakata; Takao Nishioka; Nobuya Oooka; Kenya Motoyoshi, all of Hyogo, Japan

[73] Assignee: Sumitomo Electric Industries, Ltd., Osaka, Japan

[21] Appl. No.: 387,430

[22] Filed: Jul. 31, 1989

Related U.S. Application Data

[63] Continuation of Ser. No. 151,642, Feb. 2, 1988, abandoned.

[30] Foreign Application Priority Data

Feb. 2, 1987 [JP] Japan ............................ 62-22054
Feb. 2, 1987 [JP] Japan ............................ 62-22056
Feb. 2, 1987 [JP] Japan ............................ 62-22057

[51] Int. Cl.$^5$ ............................................ B32B 15/04
[52] U.S. Cl. .................................. 428/627; 428/632; 428/660; 428/665; 428/673
[58] Field of Search ............... 428/621, 622, 627, 628, 428/632, 660, 665, 670, 673; 228/122

[56] References Cited

U.S. PATENT DOCUMENTS

| | | | |
|---|---|---|---|
| 4,554,277 | 12/1985 | Ito | 428/632 |
| 4,740,429 | 4/1988 | Tsuno | 428/627 |
| 4,746,582 | 5/1988 | Tsuno | 428/627 |

FOREIGN PATENT DOCUMENTS

| | | | |
|---|---|---|---|
| 0090657 | 10/1983 | European Pat. Off. | |
| 160301 | 11/1985 | European Pat. Off. | 428/450 |
| 2541432 | 4/1976 | Fed. Rep. of Germany | |
| 3514320 | 11/1985 | Fed. Rep. of Germany | |
| 317257 | 12/1988 | Japan | 228/122 |
| 87059 | 3/1989 | Japan | 228/122 |
| 1022165 | 3/1966 | United Kingdom | |

Primary Examiner—R. Dean
Assistant Examiner—George Wyszomierski
Attorney, Agent, or Firm—Cushman, Darby & Cushman

[57] ABSTRACT

A ceramics-metal joined body which excels in high temperature characteristics and joint strength is formed by metallizing the surface of ceramics such as oxides, carbides, borides, nitrides, and composites thereof, and joining a metallic member through a solder to the metallized surface.

10 Claims, 1 Drawing Sheet

CERAMICS-METAL JOINTED BODY

This is a continuation of application Ser. No. 07/152,642, filed Feb. 2, 1988, which was abandoned upon the filing hereof.

FIELD OF THE INVENTION

This invention relates to a ceramics-metal joined material, and especially to a joined body which excels in high temperature characteristics.

More particularly, this invention relates to a ceramics-metal joined body which excels in high temperature characteristics and joint strength which is formed by metallizing the surface of ceramics such as oxides, carbides, borides, nitrides and the composites thereof, and joining a metallic member through a solder to the metallized surface.

BACKGROUND OF THE INVENTION

Ceramics exhibit excellent characteristics in mechanical strength, heat resistance, abrasion resistance etc. but in general are joined with difficulty to metal. In particular, the strength at the joint is so low that the desired characteristic of ceramics may not be sufficiently displayed and that the subsequent application thereof is restricted.

As a method for joining ceramics and metal, especially as a method for treating the surface of ceramics before joining them, there are mentioned a molybdenum-manganese method, an active metal method, an oxide solder method and a high melting method etc.

In the molybdenum-manganese method, a fine powder which is added with Mo, Mo-Mn, W, W-Mn etc. is mixed with an organic binder to form a paint, the surface of ceramics is coated with the paint and metallized in a wet hydrogen or wet forming gas at a temperature of 1,300°–1,700° C., and then nickel-plated and joined to a metal by means of a solder. In this method, the Mn in the metallized layer is reacted with the moisture in the wet forming gas to form MnO, which is dissolved into the glass layer of ceramics and joins the ceramics to the metallized layer. The plated nickel formed on the surface of the metallized layer then enters into the layer during heat treatment thereafter or by soldering and diffusion in Mn and Mo resulting in a joint.

In the active metal method, an active metal such as Ti, Zr etc. is used, which is active at a high temperature and reacts easily with ceramics. Namely, an active metal in the form of plate or foil is placed between the ceramics and a metal to be joined and then heat-treated in vacuum or in an inert gas to adhere them. An active metal soldering method is described in *NIKKEI MECHANICAL*, Jan. 13, 1986. In this active metal soldering method, both a solder and an active metal are used wherein a solder in the form of foil is used together with an active metal or a solder added with an active metal is used. A method is also disclosed wherein an active metal such as Ni in the form of powder is applied onto the surface of ceramics such as $Si_3N_4$ and heated under vacuum to metallize it.

The methods as mentioned above are the pretreatment methods through which the surface of ceramics is metallized to make it capable of being soldered, however the application of such a metallizing method still could not obtain a sufficient joint strength.

There are mentioned particular methods for joining ceramics and metal as follows:

As an active metal soldering method, there is mentioned a previous example in which a Ti-Cu-Ag alloy solder was used, whereby the high temperature strength on the joint boundary surface was low and the reduction of strength occurred at a temperature above 400° C. (*Zairyo Gijutsu*, Vol. 4, No. 2, 1985).

Further, even in the method in which a metallized film is formed on the surface of ceramics to join ceramics and metal, a method has not been discussed, by which a metallized film may be formed, which exhibits good characteristics (high temperature strength) even at a temperature above 500° C. In the method for forming a metallized film using an active metal, in which Ti is contained in a solder and a metallized surface is formed to join the ceramics and metal, the solder was softened at a high temperature, however, the strength was greatly reduced at this high temperature range, and therefore this method was not used, whereas an acceptable strength was obtained at a temperature from room temperature to 400° C.

In the high melting metal method, a fine powder added with Mo, Mo-Mn, W-Mn etc. is mixed with an organic binder to form a paint, which is coated on the surface of ceramics, metallized in a wet hydrogen or a wet forming gas at a temperature 1,300°–1,700° C. and nickel-plated, and then the ceramics is joined by means of a solder to a metal. In this method, Mn in the metallized layer reacts with the moisture in the wet forming gas to form MnO, which is dissolved in the glass layer in the ceramics to join the ceramics and the metallized layer. The Ni-plating formed on the surface of the metallized layer then enters into the metallized layer during heat treatment or soldering to disperse in Mn and Mo with each other to join the ceramics and metal.

Moreover, an experiment is reported in Suganuma et al., *Communication Amer. Ceramic Soc.*, (1983), c-117, in which ceramics of the nitride series and Mo or Fe were heated under a pressure of 3 GPa and a temperature of 1,300°–1,400° C. or more to join them. A method is also disclosed in which a mixed powder of Mo and $Si_3N_4$ is placed as an intermediate layer to moderate remaining stress.

In Nicholas et al., *J. Mater. Sci.*, 13 (1978), p. 712, a study is reported in which in order to search the effect of the remaining stress on the joint strength, aluminum is used as an insert to join various kinds of metals and $Al_2O_3$.

However, by the above-mentioned methods for joining ceramics and metal, a sufficiently high joint strength between ceramics and metal could not be obtained. The previous technology for joining ceramics and metal provides only such a joined body that has a joint strength up to 15–20 kg/mm$^2$, which does not reach to a level of 30 kg/mm$^2$ required for the application to machinery parts, resulting in no development in the application of a ceramics-metal jointed body.

As a first consideration, problems will be described in the metallization method for forming the boundary surface between ceramics and metal. Among the previous methods as described above, the active metal method is advantageous in the formation of strong boundary surface of a joint. A previous method for metallizing ceramics by means of active metal, there has been proposed a method by means of an alloy solder mixed with an active metal or a method in which an active metal in the form of foil or plate is used. By these methods, however, an active metal of high purity can not be used, as a result of the reduction in activity due to the presence of impurities. On the other hand, the active metal is apt to be affected, for example, oxidized due to its high activity, which is not utilized efficiently. For example, though a method is proposed in which Ti of high purity is deposited on the surface of ceramics by the ion-plating method, the Ti-layer deposited is joined in the solid phase to the surface of ceramics so that it shows low wettability to ceramics and the reaction with the ceramics does not progress resulting in a low boundary strength.

The previous technique provides a joint boundary surface strength of 20 kg/mm$^2$ and therefore a technique for the formation of boundary surface providing a high boundary surface strength has not been discovered.

For jointing a metallized ceramics and metal, there have been the following problems. One of the fundamental reasons that a high joint strength can not be obtained in the jointing of ceramics and metal is due to the fact that a great difference exists between the heat expansion coefficient of the ceramics and that of the metal, and that a large thermal stress during the jointing results in an impossible jointing or a great reduction of joint strength. The heat expansion coefficient of ceramics (in general) is within the range of $3.8-8.0 \times 10^{-6}/°$ C., whereas the heat expansion coefficient of metal is $10-20 \times 10^{-6}/°$ C. The difference between these expansion coefficients causes a large thermal stress between the ceramics and the metal on heating or cooling during the joining or its use. Such a problem has not been solved by any one of the above-mentioned methods.

Further, as a method for joining mechanically a ceramics part and a metal part, methods for casting, sintering, inserting, bolting and so on have been previously used. However, these methods require complex designs and applications and occasionally result in an unevenness and the breaking of ceramics owing to the thermal stress during the joining step (*Kogyo Zairyo*, Vol. 31, No. 12, p. 51). Moreover, these methods show less resistance to thermal shock and the like and have not been widely used in practice.

SUMMARY OF THE INVENTION

Accordingly, an object of the present invention is to solve the above mentioned problems in the previous technique and provides a ceramics-metal joined body having a joined portion which excels in high temperature characteristics.

Another object of the present invention, is to solve the problem of the formation of a strong joint boundary surface as well as the problem of the reduction in the joint strength resulting from the difference between the heat expansion coefficient of ceramics and that of metal and provide a ceramic-metal joined body having a joined portion of high strength.

According to the present invention, there is provided a ceramics-metal joined body which excels in high temperature characteristics and is characterized in that a ceramic part and a metal part are joined through a deposition layer of one or more metals containing an active metal, such layer being formed of the surface of ceramics part to be joined by means of a physical deposition process, and a layer of a solder having a high melting point above 900° C. on the side of the metal part, and that the deposited metal is diffused within the ceramics part and a layer of high melting solder.

Further, according to the present invention, there is provided a ceramics-metal joined body characterized in that a ceramics part and a metal part are joined through a deposition layer of one or more metals containing an active metal, such layer being formed on the surface of the ceramics part to be joined by means of a physical deposition process, and a multi-joint layer having at least one layer of super hard alloy the super hard alloy layer being kept between two solder layers.

The number of the super hard alloy layer at the multi-joint portion may be one and it is advantageous to form more than two layers, in which both sides of each layer of super hard alloy are sandwiched by solder layers.

According to a preferred embodiment of the invention, the deposition layer of metal, i.e. the metal boundary surface on the surface of ceramics part is formed by depositing more than two metals containing an active metal by means of a physical deposition process and heat-treating at a temperature higher than the melting point of the deposition layers. Preferably, the heat treatment of metal layer is carried out under vacuum.

According to another preferred embodiment of this invention, the surface of ceramics is metallized by the heat treatment under vacuum at a temperature a little higher than the melting point of the alloy of the deposition layers of metal, i.e. at a temperature within a range in which the ceramics is not broken, the melting point of the metal being less than 1,600° C.

Moreover, according to a further preferred embodiment of this invention, the super hard alloy contains more than 50% of WC and a balance of iron series such as Co, Ni or Fe, and preferably, upon considering the difference between the heat expansion coefficient of the ceramics and that of the metal to be joined, the content of a metal of iron series in the super hard alloy is varied to adjust the heat expansion coefficient.

According to another preferred embodiment of this invention, the solder is such a substance that may be soft and have a large plastic deformation capacity, e.g. Ag solder.

As the physical deposition process to be used in the metallization step according to this invention, an ion-plating process or a spattering process is preferred. In the case in which more than two kinds of metals are deposited as in the method of this invention, each metal may either be successively deposited or multi-deposited.

Multi-deposition means a simultaneous deposition of different kinds of metals or alloys.

Further, as active metals which are used preferably in the method of this invention, there are mentioned Ti, Ni, Zr, Nb, W, Mo, Tl, Fe, Al and the like.

Examples of ceramics for the joined body of this invention are ceramics of oxides, carbides, borides, nitrides and the composites thereof.

Additionally, according to this invention, there is provided a ceramics-metal joined body characterized in that the laminated multi-deposition of Ti, Cu and Ag film having a total thickness of 0.1–5.0 μm is formed on the surface of the ceramic part by means of a physical deposition process, the surface of ceramics is metallized through mutual diffusion between the ceramics part and the metal deposition layer as well as between the metal deposition layers, and the metallized ceramics part and the metal part are joined through the multi-joint part, which has at least one layer of super hard alloy containing more than 60 wt.% WC and in which an Ag solder is applied onto both sides of the layer of super hard alloy.

Further, according to a preferred embodiment of this invention, the deposition layers of Ti, Cu and Ag are heat-treated at a temperature above the melting point of whole deposition layer in such a manner that the layers are heated to form a liquid phase resulting in mutual diffusion between the ceramics part and the deposition layer of the metal as well as between the deposition layers.

The number of layers of super hard alloy at the multi-joint portion may be one and it is preferably to form more than two layers, in which both sides of each layer of super hard alloy are sandwiched by solder layers.

Further, according to a preferred embodiment of this invention, the deposition layer of Ti, Cu and Ag may be formed by either a successive deposition of each metal or by multi-deposition of an alloy.

As the physical deposition process to be used in the metallization step according to this invention, an ion-plating process or a spattering process is preferred. According to a preferred embodiment of this invention, the deposition layer of metal is heated under vacuum in order for diffusion to take place.

Examples of ceramics for the joined body of this invention are ceramics of oxides, carbides, borides, nitrides and the composites thereof.

DETAILED DESCRIPTION OF THE PREFERRED EMBODIMENTS

With reference to the drawings, (FIGS. 1-3), the ceramics-metal joined body according to this invention will be explained.

Figure 1:
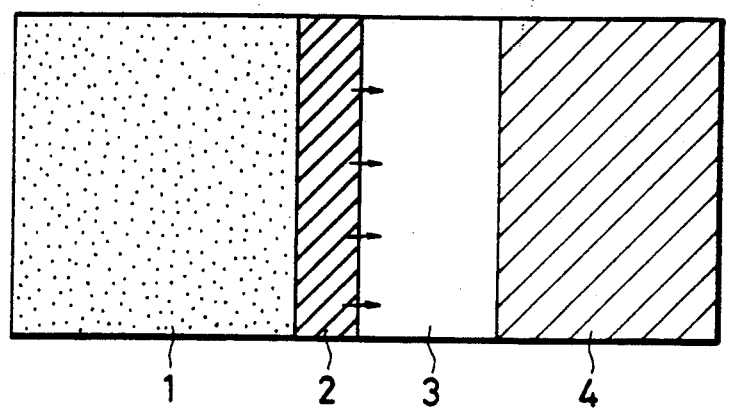
FIG. 1, shows a schematic drawing of the first example of the ceramics-metal joined body according to this invention.

FIG. 1 describes the first example of a ceramics-metal joined body of this invention, in which one or more metals containing an active metal, for example, Ti, Ni, Zr, Tl, Mo, W, Fe, Al or Nb deposited on the surface of ceramic part 1 to be joined by means of a physical deposition process such as an ion-plating process or a spattering process to form a deposition layer, i.e. a metallized surface 2.

A high melting solder layer 3 is interposed between the deposition layer 2 and the metal part 4. As shown by the arrows in the figure, the active metal in the deposition layer 2 is diffused into the high melting solder layer 3 due to high temperatures during the soldering.

On the other hand, the high melting solder layer 3 is bonded to both the deposition layer 2 and the metal part 4. The solder forming such high melting solder layer 3 is preferably an Au solder, a Ni solder or a Pb solder.

According to a preferred embodiment of this invention, the thickness of deposition layer 2 is preferably within the range of 0.01-20 $\mu$m. Further, according to an embodiment of this invention, the ceramics part 1 is one of oxides, carbides, borides, nitrides and the composites thereof.

The features of the ceramics-metal joined body of this invention are described in detail.

For the manufacture of the ceramics-metal joined body according to this invention, one or more metals containing an active metal are deposited on the surface of the ceramics part by means of a physical deposition process such as an ion-plating process or a spattering process to contact the active metal in a state of higher activity to the ceramics. A metal vapour of high purity is then deposited under vacuum in the physical deposition process, so that the active metal in a pure state (i.e. in a state of high purity without corrosion such as oxidation) may be contacted with the ceramics. Thus, in the present invention, the reactivity of an active metal is raised, to react the ceramics with the active metal and the formation of oxides and the like, which effect adversely on the boundary surface between the ceramics part and the deposition layer, is at the same time inhibited. For example, in the case of using Ti as the active metal, the physical deposition process inhibits the formation of TiO and $TiO_2$, which affects to a large extent the reduction of boundary surface strength, and at the same time ensures the deposition of active metal in a state of high purity and a clean and homogeneous state.

Further, the physical deposition process may provide the formation of very thin deposited film. Namely, the active metal in the deposition layer diffuses into the ceramics part to join it strongly and at the same time, diffuses into the high melting solder due to the high temperature during the soldering. Therefore, the reduction of high temperature strength on the boundary surface has not occurred, which is shown on the joint boundary surface of a simple active metal. An active metal is apt to react with oxygen in an atmosphere of high temperature due to its high activity so that a single active metal on the joint boundary surface may cause the reduction of strength at high temperatures. Accordingly, in the present invention, the active metal having the thermal problem on the joint boundary surface is diffused into a high melting solder during the soldering without remaining the active metal as a simple substance on the boundary surface. Since the active metal diffuses into a high melting solder and lowers the high temperature characteristics of the solder, the amount of active metal deposited is controlled so that the deterioration of the high temperature characteristics may result to only a small extent.

In the present invention, a ceramics-metal joined body which excels in high temperature characteristics is obtained by forming a very thin metal film on the surface of ceramics, soldering with a high melting solder to diffuse the metal film, which is thermally weak, into the solder during the soldering, whereby both the joint boundary surface and the joint portion (solder) excels in high temperature characteristics.

Thus, in the present invention the thinner metal film obtained by the physical deposition process affects the high melting solder to a lesser degree and provides excellent high temperature characteristics on the joint boundary surface. The thickness of deposition layer has been determined in such an amount that the metal layer may diffuse into the ceramics to be consumed and the balance of the metal layer may diffuse sufficiently in the high melting solder.

Accordingly, the thickness of the deposition layer is 0.01-20 $\mu$m. A thickness of more than 20 $\mu$m lowers greatly the high temperature strength on the joint boundary surface, and a thickness less than 0.01 m requires a greater amount of metal for the formation of a strong boundary surface on the ceramics.

Further, according to this invention, the soldering is carried out preferably under vacuum to protect the active metal in the deposition layer, whereby the effects of the atmosphere to the boundary surface formed by the active metal on the ceramics is minimized resulting in a joint of very high strength.

In the present invention, the use of high melting solder (a melting point of more than 900° C.) which excels in the high temperature characteristics improves the high temperature characteristics of the ceramics-metal joined body. The joint of ceramics and metal by means of a solder is simple, ,resulting in the ease of manufacture of a joined body.

As described above, a metal layer of high reactivity and ceramics are joined strongly with almost no influence of thermal stress by metal, so that a joined body may be obtained which is easily joined and has a large joint strength.

While the present invention has been illustrated by detailed descriptions of preferred embodiments thereof, it will be obvious to those skilled in the art that various changes in form and detail can be made therein without departing from the true scope of the invention.

EXAMPLE 1

A SiC ceramics added with $B_4C$ was processed into a size of $10 \times 10 \times 20$ mm and deposited with Ni of 99.99% purity in a thickness of 1.0 μm by means of an ion-plating device; pressure: $5 \times 10^{-6}$ Torr, base plate temperature: 400° C.

The resulting SiC ceramics having a metal layer was joined to a S 45 C steel with a Ni solder (Ni-4Si-16.5 Cr-4 Fe-3.8 B) by heating at 1,100° C. under vacuum. A test piece of $3 \times 4 \times 40$ mm was cut from the joined body and processed and a 4 point bending strength test was carried out within a range of from room temperature to 800° C. The results are shown in the Table 1. As a control, a joined body of SiC ceramics and S 45 C steel with an active metal solder (Ti-Cu-Ag solder) was subjected to the same 4 point bending strength test.

TABLE 1

| Temperature (°C.) | | Bending Strength (Kg/mm²) | | | | |
|---|---|---|---|---|---|---|
| | | Room Temp. | 200 | 400 | 600 | 800 |
| Example 1 | Ni deposition + Ni solder | 10.5 | 11.3 | 10.8 | 10.7 | 8.5 |
| Control | Active metal solder | 8.7 | 8.2 | 8.3 | 0.5 | Impossible |

As seen from the Table 1, the jointed body according to this invention does not show the reduction of bending strength at a temperature above 400° C. and shows excellent high temperature characteristics, whereas the joined body of the control shows greater reduction of bending strength at a temperature above 400° C. Especially, the joined body according to this invention keeps a high strength at 800° C., whereas the solder in the joined body of the control is molten.

EXAMPLE 2

An α-$Al_2O_3$ ceramics of 99% purity was processed to specimens of $10 \times 10 \times 20$ and they were deposited with Zr of 99% purity in a thickness of 0.001–50 μm by spattering, respectively. The resulting specimens were joined to Kovar metal with an Au solder (Au-Cu). As control, the similar joint was made with an Ag solder (Ag-Cu).

The resulting joined bodies were cut respectively to specimens of $3 \times 4 \times 30$ mm and processed rated on the 4 point bending strength within a range of from room temperature to 800° C. The results are shown in the Table 2.

TABLE 2

| Thickness of Film Deposited | Solder | Bending Strength (Kg/mm²) | | | | |
|---|---|---|---|---|---|---|
| | | Room Temp. | 200 | 400 | 600 | 800 |
| 0.001 | Au Solder | 3.2 | 3.9 | 3.5 | 2.8 | 2.4 |
| 0.01 | Au Solder | 8.2 | 8.5 | 8.3 | 7.5 | 7.2 |
| 0.1 | Au Solder | 9.5 | 9.5 | 9.7 | 9.8 | 8.5 |
| 0.5 | Au Solder | 12.5 | 11.9 | 11.7 | 12.0 | 10.4 |
| 1 | Au Solder | 15.9 | 17.0 | 17.2 | 16.8 | 15.7 |
| 1 | Au Solder | 16.5 | 16.9 | 17.5 | 5 | Impossible |
| 5 | Au Solder | 14.5 | 15.0 | 15.7 | 14.2 | 13.0 |
| 10 | Au Solder | 15.0 | 14.8 | 14.7 | 14.0 | 12.2 |
| 30 | Au Solder | 14.5 | 14.0 | 13.5 | 5.0 | 3.9 |
| 50 | Au Solder | 12.5 | 11.0 | 12.2 | 5.0 | 3.5 |

As seen from the Table 2, the joined body according to this invention exhibits excellent strength within a range of high temperatures up to 800° C., whereas the strength of control using an Ag solder is greatly lowered at 600° C. Further, it is shown that a joined body which excels in both room temperature strength and high temperature strength within a range of deposition layer has a thickness of 0.01–20 μm.

EXAMPLE 3

A face part of an exhaust valve for an engine was made from $Si_3N_4$ and joined to a stem of austenite steel as follows:

The surface to be jointed of the face part of $Si_3N_4$ was deposited first with Tl and then with Cu by means of an ion-plating device and joined to the stem at 1,150° C. with a Pd solder (Ag-Pd-Mn).

When the resulting exhaust valve of $Si_3N_4$—steel was fitted to an automobile engine and operated at a rotation rate within a range of 2,000–7,000 rpm for 100 hrs, no problems occurred and only a little discoloration in the joint portion of exhaust valve after operation was found.

As described above, this invention consists in the improvement of the high temperature characteristics of ceramics-metal joined body, and the applicable temperature range up to about 500° C. of the previous ceramics-metal joined body can be raised to a temperature range of about 800° C., which is an upper limit of high melting solder.

Accordingly, ceramics can be applied to fields where single ceramics can not be used due to low toughness, where a product of complex shape is manufactured and use at a higher temperature, at which the previous joining method can not be used, is required. Such a ceramics-metal joined body according to this invention may be used in many fields where ceramics are used, such as for example, for engine parts (piston head, engine cylinder, turbocharger etc.) or for joining a heat-resistant or insulating material in a high temperature furnace and in space aviation.

Figure 2:
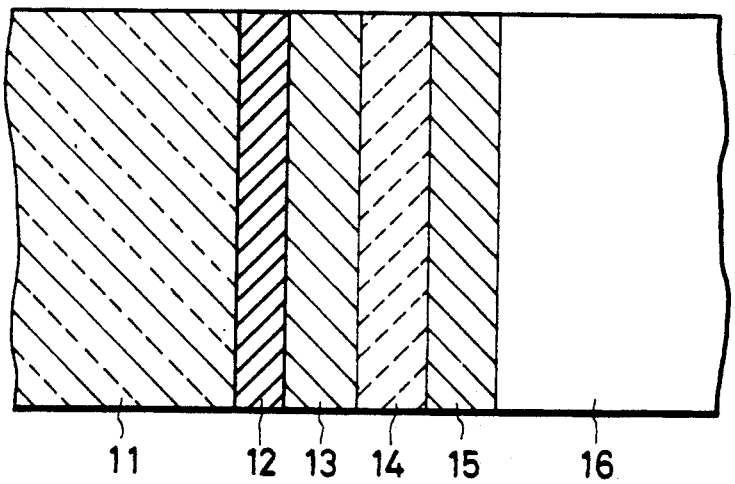
FIG. 2, shows a schematic drawing of the second example of the ceramics-metal joined body according to this invention.

FIG. 2 is a sectional view of the second example of the ceramics-metal joined body according to the present invention. As shown, a ceramics part 11 and a metal part 16 are joined. A metal deposition layer 12 is formed on the surface of the ceramics part 11 by means of a physical deposition process. The ceramics part 11 having the deposition layer 12 is joined through a multi-joint portion, in which layers 13 and 15 of Ag solder are applied onto both sides of a supper hard alloy layer 14, to the metal part 16.

In the joined body, the surface of ceramics part 11 is deposited with an active metal by means of a physical deposition process and the high activity of the active metal is kept in the joint portion. Further, the ceramics part and the metal part are joined through a multi-joint portion comprising the solders 13 and 15, between which a super hard alloy layer 14 having a heat expansion coefficient near to that of the ceramics part 11 is placed, so that a thermal stress may be moderated and absorbed by the super hard alloy layer 13. As the solder layer 12, a soft Ag solder having a high plastic deformation capacity is used, which can act as a cushion between the super hard alloy and metal resulting in a great reduction of the remaining stress.

As described above, the joined body according to this invention is characterized in that the surface of ceramics is metalized with an active metal while maintaining a high activity, at least one layer of super hard alloy is provided and the ceramics and the metal are joined through a multi-joint portion, in which solders are applied to both sides of super hard alloy layer.

For the manufacture of the ceramics-metal joined body, one or more metals containing an active metal are deposited on the surface of the ceramics part by means of a physical deposition process such as an ion-plating process or a spattering process to contact the active metal in a state of higher activity to the ceramics. A metal vapour of high purity is deposited under vacuum in the physical deposition process, so that the active metal in a pure state (i a state of high purity without corrosion such as oxidation) may be contacted to ceramics. Thus, in the present invention, the reactivity of an active metal is raised to react the ceramics with the active metal, and the formation of oxides and the like, which effect adversely on the boundary surface between the ceramics part and the deposition layer, is simultaneously inhibited. For example, in the case of using Ti as an active metal, the physical deposition process inhibits the formation of TiO and $TiO_2$, which affects to a large extent the reduction of boundary surface strength, and at the same time, ensures the deposition of active metal in a state of high activity and a clean and homogeneous state.

As mentioned above, as an active metal, there is used Ti, Ni, Zr, Nb, W, Mo, Tl, Fe and Al having a high activity.

Further, in a preferred embodiment of this invention, more than two metals containing an active metal are deposited to metallize the surface of ceramics to be joined, because when a layer or layers (one multi-layer or plural deposition layers of each single metal) of more than two metals are heated, the metals form a eutectic alloy and the melting point is lowered to a great extent. In a more preferred embodiment, the melting point of the metal layer is less than 1,600° C.

The layer(s) of more than two metals deposited is (are) then heated at a temperature above the melting point to react in a molten state with the ceramics, whereby the contact of metal layer in the molten state to the ceramics improves the wettability thereof and the contact surface between the ceramics and the active metal is increased resulting in that the activity of the active metal may be used to the maximum extent and a strong reaction layer may be formed to the ceramics. Accordingly, the layer of metal deposited diffuses into the ceramics and each metal to form a strong joint boundary surface.

Thus, the wettability to ceramics is greatly improved than in the reaction in a solid state and this effect along with the formation of metal layer by a physical deposition process may use the reactivity of said active metal to the maximum extent. The metal deposited is heated to yield a molten state and reacts with the ceramics homogeneously, so that a uniform and stable strength of the boundary surface may be obtained.

Further, it is preferable to carry out the heat treatment under vacuum to yield a molten state, because a joint boundary surface of higher strength is obtained without losing the activity of the active metal.

Thus, the metallized layer formed by the physical deposition of an active metal according to this invention shows a joint strength with ceramics on the level of 20 40 kg/mm$^2$.

The reason why the multi-joint portion is placed in the joint according to this invention in which one or more layers of super hard alloy are placed and both sides of each layer are applied with a solder will be explained as follows.

A super hard alloy is used because the heat expansion coefficient $\alpha$ of a super hard alloy is within the range of $4-8 \times 10^{-6}/°$ C. and may be adjusted to or approximately to the heat expansion coefficient of ceramics to be joined by controlling the amount of metal of iron series as binder, so that the adjustment of the heat expansion coefficient of super hard alloy to that of ceramics having a very little plastic deformation is moderate and reduce the heat stress between the ceramics and the metal during the soldering.

Further, the content of metal of iron series such as Co, Ni etc. as a binder in the super hard alloy WC provides a plastic deformability and reduces the heat stress effectively. These metals of iron series contained may provide good wettability to a solder.

On the hand, when a soft solder having a high plastic deformability is applied to both sides of said super hard alloy to form a sandwich, the solder may act as cushion to the heat stress between the ceramics and the super hard alloy as well as the super hard alloy and the metal deposited to reduce the heat stress remarkably. Further, the solder has good wettability to the super hard alloy, shows a high joint strength to metal and improves the joint strength between the ceramics and the metal.

Moreover, the joined body according to this invention is made with a solder, so that the reliability in the joint strength etc. is very high and that the soldering process is simple. When the same solder is used, a multi-joint portion of a super hard alloy layer and solder is formed and the multi-joint portion is joined to a ceramics and a metal in one step.

However, when the content of WC in the super hard alloy is less than 50 wt.%, the heat expansion coefficient of said super hard alloy becomes very large so that the heat stress between the alloy and the ceramics to be jointed may also become large resulting in occasionally the reduction of joint strength or the impossibility of forming a joint. Therefore, it is preferable to use a super hard alloy having a WC content of more than 50 wt.%.

The Ag solder shows a very good wettability to the WC super hard alloy and may reduce the heat stress owing to its softness.

As described above, in the joined body according to this invention, the strength of the boundary surface of ceramics is very high and the heat stress acting to the ceramics and metal is greatly reduced. According to this invention, the combined effect of the technique for forming a boundary surface of high strength, which is formed by depositing an active metal by means of a physical deposition process, and the technique for moderating the heat stress may provide a ceramics-metal composite of high strength, which may be applied to machine parts and the like.

EXAMPLE 4

A $\beta$-$Si_3N_4$ ceramics was processed to a size of $10\times10\times20$ mm and deposited with Ti in a thickness of 0.5 $\mu$m by means of an ion-plating device; pressure: $2\times10^{-6}$ Torr, base plate temperature: 300° C.

The above-mentioned deposited ceramics and a Cr-Mo steel of $10\times10\times20$ mm were jointed at a temperature of 820° C. through a multi-joint portion in which both sides of one or two layers of super hard alloy containing 90 Wt.% WC are sandwiched with an Ag solder.

As a control, the above ceramics and a Cr-Mo steel were joined at a temperature of 820° C. through a multi-joint portion of super hard alloy and an Ag solder in the same manner as above except that the surface of ceramic was metallized with an active metal solder (Ti-Cu-Ag).

The resulting jointed body was processed to a specimen of $3\times4\times40$ mm and the joint strength was rated by means of a 4 point bending test. The results are shown in Table 3.

TABLE 3

| Metallization | Joint | Joint Strength (Kg/mm$^2$) |
|---|---|---|
| Ti-deposition | Ag solder only | Break at the side |

TABLE 3-continued

| Metallization | Joint | Joint Strength (Kg/mm$^2$) of $Si_3N_4$ |
|---|---|---|
| Ti-deposition | Super hard metal solder one layer | 32.5 |
| Ti-deposition | Super hard metal solder two layers | 39.6 |
| Active metal solder | Super hard metal solder one layer | 20.5 |

As shown in the Table 3, the jointed body of this invention, which is formed by metallizing by means of a physical deposition process and jointing through a multi-joint portion of super hard metal-solder, exhibits excellent joint strength. Especially, two layers of super hard alloy may improve further the joint strength. To the contrary, the direct junction of ceramics to metal with a solder is broken due to a heat stress. A joined body, which is metallized by a previous active metal solder, shows a low strength of metallized boundary surface, so that the joint strength thereof is very low than that of the jointed body of this invention.

EXAMPLE 5

A partially stabilized $ZrO_2$ ceramics was processed to a specimen of $20\times20\times20$ mm and deposited with Zr and Ni successively in a thickness of 1 $\mu$m by means of a spattering device. The specimen was then jointed to a S 45 C steel at 850° C. through a multi-joint portion of a super hard alloy containing a varied amount of WC in the range of 30–95 wt.% and an Ag solder.

A specimen of $3\times4\times40$ mm was cut from each joined body and the strength was rated by a 4 point bending test. The joint strength test was carried out for the joined body as a control, which was obtained in the same manner as mentioned above except that a Cu plate was interposed instead of the multi-joint portion of super hard alloy-solder. The results are shown in the Table 4.

TABLE 4

| Metallization | Joint Portion | WC content of Super hard alloy (wt. %) | Heat expansion coeff. of joint portion ($\times10^{-6}$/C.°) | Joint strength (Kg/mm$_2$) |
|---|---|---|---|---|
| Spattering of Zr, Ni | Super hard alloy Ag solder | 30 | 9.5 | 28.5 |
| Spattering of Zr, Ni | Super hard alloy Ag solder | 50 | 8.2 | 32.0 |
| Spattering of Zr, Ni | Super hard alloy Ag solder | 70 | 6.8 | 34.5 |
| Spattering of Zr, Ni | Super hard alloy Ag solder | 95 | 4.2 | 41.3 |
| Spattering of Zr, Ni | Cu + Ag | — | 17.6 | 3.9 |

It is seen from the results as shown in Table 4 that when the WC content of a super hard alloy is increased, the heat expansion coefficient of the joint portion is lowered to that of ceramics, so that the joint strength of the joined body is improved. It is also seen that the joint strength is greatly reduced in the control, in which a Cu plate is interposed, due to its large heat expansion coefficient.

EXAMPLE 6

A one side of chip of SiC ceramics added with $B_4C$ was deposited with Ta by means of an ion-plating device. The chip was then joined to the top of locker arm at 850° C. through a composite material, in which both sides of a plate of 2 mm thick of super hard alloy containing 95 Wt.% were applied with an Ag solder of 0.2 mm thick respectively.

The resulting locker arm was fitted in an engine and the engine was tested for 100 hrs. in 10 cycles. The engine operated well and the joined body after the test exhibited no problems.

EXAMPLE 7

An $Al_2O_3$ ceramics was deposited with Ni and Cu successively in a thickness of 1.0 μm by means of an ion-plating device. The melting point of the layer of metal deposited was 1,230° C. The metal deposited was diffused into the ceramics by heating the deposition layer at a varied temperature of 1,000–1,300° C.

The above-mentioned ceramics after the metallization was joined to a S 45 C steel through a multi-joint portion, which contains two sheets of plate of super hard alloy of 3 mm thick containing 90 Wt.% WC and in which both sides of each plate were applied with an Ag solder of 0.1 mm thick.

The joined body was processed to a specimen of 3×4×40 mm and the joint strength thereof was rated by a 4 point bending test. The results are shown in the Table 5.

TABLE 5

| Temp. of heat treatment (°C.) | Joint strength $(Kg/mm^2)$ |
|---|---|
| 1000 | 22.5 |
| 1200 | 24.0 |
| 1300 | 32.5 |

It is seen from the results as shown in the Table 5 that the joint strength may be raised by heat-treating the layer of metal deposited at a temperature above its melting point 1,230° C.

As described above, the joined body according to this invention is characterized in that the ceramics is metallized with an active metal by means of a physical deposition process and joined to a metal through a multi-joint portion, in which the both sides of at least one layer of super hard alloy are supported by a solder respectively. Compared with the previous joined body, the joined body according to this invention shows a very high strength in both the joint boundary surface and the joint portion.

Accordingly, the ceramics-metal joined body of this invention can be used as structure parts, engine parts, etc., where those of previous ceramics-metal joined body were not used owing its too low strength. It may be used preferably as, especially, a turbocharger, engine piston head, rocker arm, engine cylinder and the like.

Figure 3:
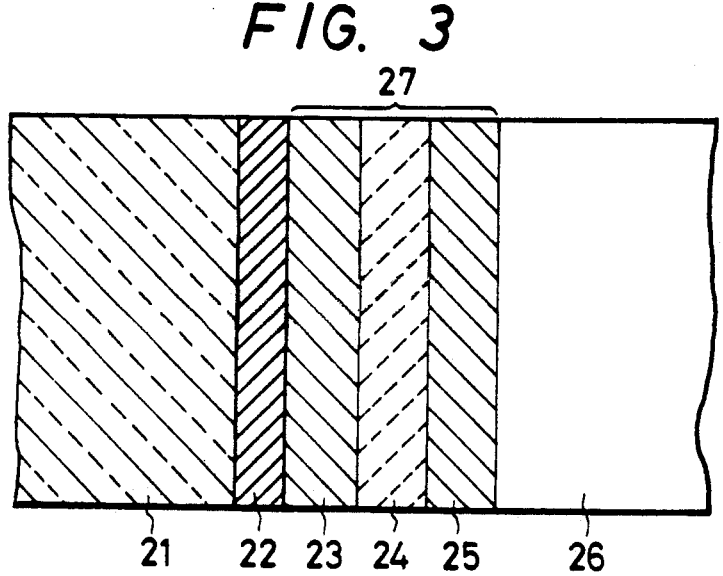
FIG. 3, shows a schematic drawing of the third example of the ceramics-metal joined body according to this invention.

FIG. 3 is a section view of the third embodiment of the ceramics-metal joined body according to this invention. As shown in the drawing, in the joined body, a ceramics part 21 and a metal part 26 are joining. A deposition layer 22 of Ti, Cu and Ag is formed on the surface of the ceramics part 21 by means of a physical deposition process. The total thickness of the deposition layer 22 is within the range of 0.1–5.0 μm. In the embodiment as shown in the drawing, the ceramics part 21 having the deposition layer 22 is joined to the metal part 26 through a multi-joint portion 27, in which both sides of a super hard alloy layer 24 are applied with an Ag solder layer 23 and 25 respectively.

As mentioned above, in the ceramics-metal joined body of this invention, the surface of ceramics part 21 is deposited with Ti, Cu and Ag by means of physical deposition process and the ceramics and the metal are joined while keeping a high activity of Ti. When the deposition layer 22 is heated at a temperature above its melting point, the diffusion takes place between the ceramics part 21 and the deposition layer 22 as well as between respective layers forming the deposition layer 22, so that a strong joint boundary surface may be formed between the ceramics part 21 and the deposition layer 22.

Further, the ceramics part and the metal part are joined through a multi-joint portion 27 comprising the solders 23 and 25, between which a super hard alloy layer 24 having a heat expansion coefficient near to that of said ceramics part 21 is placed, so that a thermal stress may be moderated or absorbed. The Ag solder layer 22 is soft and has a high plastic deformability, so that it may act as a cushion between the super hard metal and metal resulting in a great reduction of remaining stress.

As described above, the joined body according to this invention is characterized in that the surface of ceramics is metallized with three kinds of metals containing Ti having a high activity, at least one layer of super hard alloy is provided and the ceramics and the metal are joined through a multi-joint portion, in which solders are applied to both sides of each super hard alloy layer.

For the manufacture of the ceramics-metal joined body according to this invention, Ti is contacted in a state of high activity to the ceramics by depositing the surface of ceramics part with Ti, Cu and Ag by means of a physical deposition process such as an ion-plating process or a spattering process. A metal vapour of high purity is deposited under a high vacuum in the physical deposition process, so that Ti in a pure state (i.e., in a state of high purity without corrosion such as oxidation) may be contacted to the ceramics. Thus, in this invention, the reactivity of Ti is raised to react the ceramics and Ti sufficiently, and the formation of oxides and the like, which effect adversely on the boundary surface between the ceramics and the deposition layer, is inhibited simultaneously. In the case of metallization with Ti, the physical deposition process inhibits the formation of TiO and $TiO_2$, which affects to a great extent the reduction of boundary surface strength, and at the same time, ensures the deposition of Ti in a state of high activity and a clean and homogenous state.

Further, Ti is deposited in combination with Cu and Ag in this invention. Although Ti as a simple substance has a high melting point such as 1,720° C., Ti combined with Cu and Ag forms an eutectic alloy on heating and the melting point thereof is lowered to approximately 800° C. Therefore, the layer of metal deposited may be molten by heating at a relatively low temperature and reacted with the ceramics in a molten state, whereby the contact of metal layer in the molten state to the ceramics improves the wettability thereof and the contact surface between the ceramics and the active metal is increased resulting in that the activity of Ti may be used to the maximum extent and a strong reaction layer may be formed to the ceramics.

Since the layer of metal deposited is heated to a molten state in this invention, the wettability to ceramics is improved compared with the reaction in a solid phase state of prior art and the combined effect with the formation of a metal layer by a physical deposition process may use the reactivity of Ti to the maximum deposition process may use the reactivity of Ti to the maximum extent. The metal deposited is heated to a molten state and reacts with the ceramics homogeneously, so that a uniform and stable strength of boundary surface may be obtained.

Cu and Ag in the deposition layer improve the reaction of Ti with the ceramics to improve very effectively the strength of boundary surface. Further, Cu and Ag form a barrier layer for Ti of high activity after the deposition and inhibits the reaction of Ti with the atmosphere when it is placed out of the deposition device, to maintain the activity.

Further, it is preferable to carry out the heat treatment under vacuum to a molten state because a joint boundary surface of higher strength is obtained without losing the activity of active metal.

The metal layer thus deposited and heated diffuses between the ceramics and the metal layer and the respective metal layers to each other to form a strong joint boundary surface. The metallized layer formed by the physical deposition of Ti, Cu and Ag according to this invention shows a joint strength of 20-60 kg/mm$^2$ to the ceramics.

When the total thickness of the metal deposition layer is less than 0.1 μm, no effect is obtained by the metallization with an active metal. On the other hand, when it is greater than 0.5 μm, the effect of metallization is saturated and the formation of thermal stress of metal deposition layer having a greater heat expansion coefficient than the ceramics is effected greatly and that a sufficient joint strength is not obtained.

The reason why the multi-joint portion is placed in the joint in which one or more layers of super hard alloy are placed and both sides of each layer are applied with a solder is explained as follows.

A super hard alloy is used because the heat expansion coefficient is within the range of $4.8 \times 10^{-6}/°$ C. and the heat expansion coefficient of ceramics to be jointed by controlling the amount of metal of iron series such as Co, Ni and the like as binder, so that the adjustment of the heat expansion coefficient of super hard alloy to that of ceramics having a very little plastic deformation may be moderate and reduce the heat stress between the ceramics and the metal during soldering.

Moreover, the content of metal of the iron series such as Co, Ni, etc., as binder in the super hard alloy WC provides a plastic deformability and reduces the heat stress effectively. These metals of the iron series contained may provide a good wettability to a solder.

On the other hand, when a soft solder having a high plastic deformability is applied to both sides of the super hard alloy to form a sandwich, the solder may act as cushion to the heat stress between the ceramics and the super hard alloy as well as the super hard alloy and the metal deposited to greatly reduce the heat stress. Further, the solder has a good wettability to the super hard alloy, shows a high joint strength to the metal and improves the joint strength between the ceramics and the metal.

Further, the joined body according to this invention is made with a solder, so that the reliability in the joint strength, etc., is very high and that the soldering process is very simple. When the same solder is used, a multi-joint portion of super hard alloy layer and solder is formed and the multi-joint portion is jointed to a ceramics and a metal in one step. It is preferable to carry out the hot joint of ceramics and metal through the multi-joint under vacuum to protect Ti.

However, when the content of WC in the super hard alloy is less than 60 wt.%, the heat expansion coefficient of the super hard alloy becomes very large so that the heat stress between the alloy and the ceramics to be joined may also become large resulting in occasionally the reduction of joint strength. Therefore, a super hard alloy having a WC content of more than 60 wt.% is used.

Further, the Ag solder shows a very good wettability to the WC super hard alloy and may reduce the heat stress owing to its softness.

As described above, in the joined body according to this invention, the strength of boundary surface of ceramics is very high and the heat stress acting to the ceramics and metal is greatly reduced. According to this invention, the combined effects of the technique for forming a boundary surface of high strength, which is formed by depositing Ti, Cu and Ag by means of physical deposition process, and the technique for moderating the heat stress may provide a ceramics metal composite of high strength, which may be applied to machine parts and the like.

EXAMPLE 8

A β-Si$_3$N$_4$ ceramics was metallized in the following processes i), ii) and iii):
i) Ti of −0.5 μm thickness, Cu of 1.0μ thickness and Ag of 1.0 μm thickness were deposited by means of an ion-plating process;
ii) A Cu layer was formed with Cu$_2$S by the heat treatment by the copper sulfide process;
iii) A metallized layer was formed with a Ti-Cu-Ag solder by the heat treatment at 850° C. under vacuum by the active metal solder process.

After the metallization, the ceramics was joined to a carbon steel for construction at 830° C. through a multi-joint portion, in which a center layer of super hard alloy was sandwiched with an Ag solder Specimens were cut from the resulting joined bodies and the 4 point bending test was carried out to rate the joint strength. The results are shown in the Table 6.

TABLE 6

|  | Metallization | Joint Strength (Kg/mm$^2$) |
|---|---|---|
| Example | 1 | 58.0 |
| Control | 2 | 8.5 |
|  | 3 | 19.2 |

It is seem from the results as shown in the Table 6 that the joined body according to this invention exhibits excellent joint strength compared with those joined after the metallization by the copper sulfide process or the active metal solder process.

EXAMPLE 9

A SiC ceramics was deposited with a Ti-Cu-Ag alloy by means of an ion-plating device and then subjected to the heat diffusion treatment at a varied temperature within the range of 600–1,000° C. Thereafter, the ceramics was joined to SUS 304 at 830° C. under vacuum through the same multi-joint portion of super hard alloy and Ag solder used in Example 8.

Specimens were cut from the resulting joined bodies and the 4 point bending test was carried out to rate the joint strength. The results are shown in the Table 7.

TABLE 7

| Heat diffusion Temp. (°C.) | Joint strength (Kg/mm$^2$) |
|---|---|
| 600 | 17.3 |
| 700 | 30.2 |
| 800 | 42.3 |
| 1000 | 43.9 |

It is seen from the results as shown in the Table 2 that when the heat diffusion treatment of deposition layer is carried out at a temperature above the melting point (approximately 800° C.) of deposition layer, the wettability with the ceramics is improved due to the dissolution of metal deposited resulting in the promoted diffusion reaction. As a result, the jointed body, which was subjected to the heat diffusion treatment at a temperature above 800° C., shows improved strength.

EXAMPLE 10

The surface of ZrO$_2$ ceramics chip was deposited with Ti, Cu and Ag in a thickness of 0.4 μm respectively by means of a spattering process. The ceramics was jointed to the lower surface of upper punch of a dry press at 850° C. through the same multi-joint portion as in Example 8.

When the press was used for pressing a powdered metal for 10 hrs. at a rate of one time per 10 sec., the joint portion did not show damages such as the separation of metal layer after the test with a good joint to the mechanical load.

As described above, the jointed body according to this invention is characterized in that the ceramics is metallized with Ti, Cu and Ag by means of a physical deposition process and jointed to a metal through a multi-joint portion, in which the both sides of at least one layer of super hard alloy are supported by a solder respectively. Compared with the previous jointed body, the jointed body according to this invention shows a very high strength in both the joint boundary surface and the joint portion.

Accordingly, the ceramics-metal jointed body of this invention can be used as structure parts, engine parts, etc., where those of previous ceramics-metal jointed body were not used owing to its too low strength. It may be used preferably as, especially, a turbocharger, engine piston head, locker arm, engine cylinder and the like.

What is claimed is:

1. A ceramics-metal joined body having high temperature characteristics, comprising a ceramics part and a metal part, said body further comprising:
   a metal deposition layer of one or more metals containing an active metal or metals between said ceramics part and said metal part; and an intermediate layer comprising at least a solder layer between said metal deposition layer and said metal part,
   wherein said metal deposition layer has been formed by a process comprising one of laminate-deposition and multi-deposition of two or more metals containing an active metal or metals by means of a physical vapor deposition process and heating at a temperature above the melting point of the resultant alloy formed by said metal deposition layer, thereby to perform diffusion to said ceramics part.

2. A ceramics-metal joined body as claimed in claim 1, wherein said solder layer has a melting point above 900° C.

3. A ceramics-metal joined body as claimed in claim 1, wherein the thickness of said metal deposition layer is within the range of 0.01 to 20 μm.

4. A ceramics-metal joined body as claimed in claim 1, wherein the melting point of said metal deposition layer is below 1,600° C.

5. A ceramics-metal joined, body as claimed in claim 1, wherein said solder comprises any one of the group consisting of an Ag solder, a Ni solder and a Pd solder.

6. A ceramics-metal joined body as claimed in claim 1, wherein the surface of said ceramics part has been laminate- or multi-deposited either separately or simultaneously with Ti, Cu and Ag alloy in a thickness of 0.1–5.0 μm by means of a physical deposition process, thereby to form said metal deposition layer.

7. A ceramics-metal joined body as claimed in claim 6, wherein said metal deposition layer is heated at a temperature above the melting point of the resultant alloy formed by said metal deposition layer to react in a liquid phase state with said ceramics part and to perform mutual diffusion between said ceramics part and said metal deposition layer.

8. A ceramics-metal joined body as claimed in claim 1, wherein said active metals comprises any one of the metals selected from the group consisting of Ti, Ni, Zr, Nb, W, Mo, Tl, Fe and Al.

9. A ceramics-metal joined body having high temperature characteristics, comprising a ceramics part and a metal part, said body further comprising:
   a metal deposition layer of one or more metals containing an active metal or metals between said ceramics part and said metal part; and an intermediate layer comprising at least a solder layer between said metal deposition layer and said metal part,
   wherein said metal deposition layer has been formed by a process comprising one of laminate-deposition and multi-deposition of two or more metals containing an active metal or metals by means of a physical vapor deposition process and heating at a temperature above the melting point of the resultant alloy formed by said metal deposition layer thereby to perform diffusion to said ceramics part; and
   wherein said intermediate layer is a multi-joint layer comprising at least one layer of super hard alloy and solder layers provided at both sides of said super hard alloy.

10. A ceramics-metal joined body as claimed in claim 9, wherein said layer of said super hard alloy contains, not less than 50% of WC.

* * * * *